United States Patent
Reynolds et al.

(10) Patent No.: US 12,491,383 B2
(45) Date of Patent: Dec. 9, 2025

(54) GENERATING HISTOTRIPSY THERAPY PULSES USING FULL CYCLE TRANSMIT

(71) Applicant: ACOUSTIIC INC., Bellevue, WA (US)

(72) Inventors: Paul Reynolds, Renton, WA (US); Holly Lay, Seattle, WA (US)

(73) Assignee: ACOUSTIIC INC., Bellevue, WA (US)

(\*) Notice: Subject to any disclaimer, the term of this patent is extended or adjusted under 35 U.S.C. 154(b) by 0 days.

(21) Appl. No.: 18/639,689

(22) Filed: Apr. 18, 2024

(65) Prior Publication Data
US 2025/0325838 A1    Oct. 23, 2025

(51) Int. Cl.
*A61N 7/00* (2006.01)

(52) U.S. Cl.
CPC ........ *A61N 7/00* (2013.01); *A61N 2007/0078* (2013.01)

(58) Field of Classification Search
None
See application file for complete search history.

(56) References Cited

U.S. PATENT DOCUMENTS

| | | | |
|---|---|---|---|
| 2012/0283605 A1* | 11/2012 | Lewis, Jr. | A61B 8/4281 601/2 |
| 2015/0142033 A1* | 5/2015 | Stulen | A61B 17/320068 606/169 |
| 2016/0184614 A1* | 6/2016 | Matula | A61B 8/4494 601/2 |
| 2017/0049463 A1* | 2/2017 | Popovic | A61N 7/022 |
| 2017/0071515 A1* | 3/2017 | Chevillet | A61B 5/14507 |
| 2018/0104514 A1* | 4/2018 | Gertner | A61H 23/0263 |
| 2019/0001159 A1* | 1/2019 | Chen | A61B 8/085 |

\* cited by examiner

*Primary Examiner* — Colin T. Sakamoto
(74) *Attorney, Agent, or Firm* — Butzel Long; Ian Harrison

(57) ABSTRACT

Systems and techniques are provided for generating histotripsy therapy pulses using full cycle transmit. A system may include a transducer array may include transducer elements, a computing and imaging device, and drive electronics positioned so that traces from the drive electronics to the transducer elements of the transducer array are no more than 5 cm in length. The drive electronics may be placed within a cable that connects the computing and imaging device to a handset that comprises the transducer array or within a handset that comprises the transducer array.

19 Claims, 8 Drawing Sheets

GENERATING HISTOTRIPSY THERAPY PULSES USING FULL CYCLE TRANSMIT

BACKGROUND

Histotripsy is the use of short, high intensity ultrasound waves to induce cavitation a target media, such as tissue. This may result in mechanical damage to targeted tissue. Histotripsy has been performed using half cycle, negative transmit pulses. These types of pulses require very high drive power and careful electrical ground design due to their unbalanced nature. Ultrasound devices used for histotripsy with half cycle pulses may also be very low efficiency, in part due to their use of avalanche driver circuits.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

DETAILED DESCRIPTION

Figure 1A:
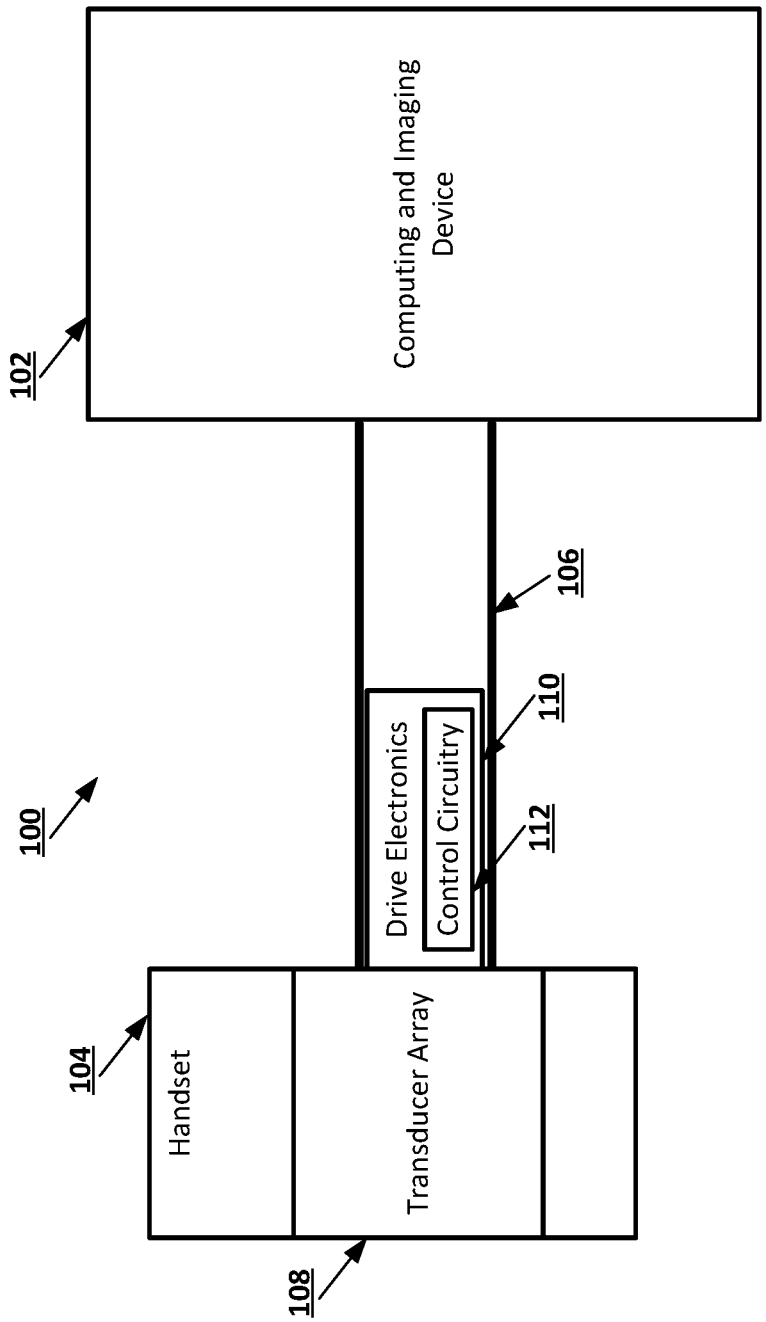
FIG. 1A shows an example system for generating histotripsy therapy pulses using full cycle transmit according to an implementation of the disclosed subject matter.

Generating histotripsy pulses using full cycle transmit may allow for mitigation of issues caused by half-cycle pulses that require very high drive powers and careful electrical ground design and are lossy with minimal impact on the generated output wave. Drive electronics for a transducer system for generating histotripsy pulses using full cycle transmit may include electronic circuits integrated into a handset of the transducer system or at the end of a cable of the transducer system. The drive electronics may enable generation of the required single cycle, or exactly controlled number of cycles, pulses at appropriate levels for histotripsy. The drive electronics may include one or multiple application specific integrated circuits (ASICs), field programmable gate arrays (FPGAs), System-on-a-chips (SoCs), discrete electronic components, or any suitable combination thereof. The drive electronics may be controlled using either integrated logic, state machines, software or a combination thereof to generate the desired pulse patterns in the generated histotripsy pulses.

The drive electronics may include, for example, ASICs with the transmit circuitry built on a high-voltage CMOS process with a gate-drive tolerance of 100V+. The control circuitry for these ASICs may be, for example, either integrated within the ASICs that the control circuitry controls, or may be digital ASICs or FPGAs closely located to, for example, less than 20 cm from, the transducers of the transducer system. The clock rate at which the transmit circuitry of the ASICs of the drive electronics is triggered may be frequency matched to within the −3 dB passband of the acoustic resonating materials of the transducers. By keeping total length of circuit board traces from the ASICs of the drive electronics to the transducers minimized, for example, less than 5 cm, electrical losses due to electrical and acoustic mismatch may be minimized. This may allow for the generation of pulses at a negative pressure sufficient to cause localized cavitation in tissue to a degree that may disrupt tissue structure depending on the Young's modulus of the tissue. The negative pressure level may be, for example, 28 to 30 MPa to cause cavitation in cancerous liver tissue. The pulses may be generated using between approximately 50V and approximately 100V, positive and negative, of drive voltage, lower than the 600-900V of drive voltage that may be needed when using half-cycle, negative transmit pulses.

The drive electronics may additionally allow frequency tuning which may be used to better match the characteristics of the transducer being used for histotripsy to reduce losses and improve power delivery. The drive electronics may also include amplitude control that may allow the use of envelope shaping of the drive pulse either in discrete steps, for example, 3 or 5 level drive, or as a continuous amplitude change. A pulse cycle that is slightly longer than one cycle may also be used to tune the output pressure wave from the transducer to maximize power delivery and control cavitation onset in the target. The overall system may also be tuned across the entirety of the power circuit of the transducer system from the power source, for example, mains power, to the piezoelectric material of the transducers.

The transducer system may also use balanced transmit pulses, which may spend equal amounts of pulse time at positive voltages and negative voltages. The balanced transmit pulses may improve power delivery to the transducer and reduce heating that results from power losses. The full-cycle waves generated using the transducer system may end on a positive half-cycle. This would be done to reinforce the manufacturing poling of the transducer system, extending its lifetime. In some implementations, the transmit pulses may be deliberately unbalanced in a controlled manner to generate additional negative pressure in the final pressure wave, which may reduce heating.

FIG. 1A shows an example system for generating histotripsy therapy pulses using full cycle transmit according to an implementation of the disclosed subject matter. An ultrasound system 100 may include a handset 104 and a computing and imaging device 102 connected by a cable 106. The handset 104 may include a transducer array 108 that may include ultrasonic transducer elements arranged in an array. The cable 106 may allow for data to be transmitted in both directions between the handset 104 and the computing and imaging device 102. The cable 106 may also carry power to the handset 104. The computing and imaging device 102 may include any suitable computing hardware, running any suitable software, and any other suitable electronics to operate the ultrasound system 100, including supplying power and control signals to ultrasonic transducer elements of the transducer array 108, for example, through the cable 106, receiving signals from the transducer elements of the transducer array 108, performing any suitable computation to generate images from the signals received from the transducer elements of the transducer array 108, and displaying generated images, for example, on a display directly connection to the computing and imaging device 102, or otherwise sending the generated images to a device, for example, a tablet or phone, that can display the generated images. The computing and imaging device 102 may have any suitable interface to allow a user to control the ultrasound system 100. The computing and imaging device 102 may be, or may include, a computer 20 as shown in in FIG. 5. The computing and imaging device 102 may also include any suitable electric and electronic components for delivering power to the handset 104 from any suitable power source, such as a battery or mains power.

The cable 106 may include drive electronics 110. The drive electronics 110 may include electronics and accompanying circuitry that may drive the transducer elements of the transducer array 108 using power from the cable 106. The drive electronics 110 may be located at the end of the cable 106 closest to the handset 104 and may be positioned as close to the transducer array 108 as possible. The drive electronics 110 may include, for example, ASICs with the transmit circuitry built on a high-voltage CMOS process with a gate-drive tolerance of 100V+. Control circuitry 112 for the ASICs in the drive electronics 110 may be, for example, integrated within the ASICs the control circuitry controls. The clock rate at which the transmit circuitry of the ASICs of the drive electronics 110 is triggered may be frequency matched to within the −3 dB passband of the acoustic resonating materials of the transducers. The total length of circuit board traces from the ASICs of the drive electronics 110 to the transducer elements of the transducer array 108 may be minimized, for example, less than 5 cm, which may minimize electrical losses due to electrical and acoustic mismatch. This may allow the transducer array 108 to generate pulses with histotripsy-level pressure waves using approximately 100V of drive voltage, lower than the 600-900V of drive voltage that may be needed when using half-cycle, negative transmit pulses.

The drive electronics 110 may additionally allow frequency tuning which may be used to better match the characteristics of the transducer array 108 being used for histotripsy to reduce losses and improve power delivery. The drive electronics 110 may also include amplitude control that may allow the use of envelope shaping of the drive pulse either in discrete steps, for example, 3 or 5 level drive, or as a continuous amplitude change. A pulse cycle that is slightly longer than one cycle may also be used to tune the output pressure wave from the transducer to maximize power delivery and control cavitation onset in the target. The overall ultrasound system 100 may also be tuned across the entirety of the power circuit of the ultrasound system 100 from the power source, for example, mains power, to the piezoelectric material of the transducer elements of the transducer array 108.

The ultrasound system 100 may also use balanced transmit pulses, which may spend equal amounts of pulse time at positive voltages and negative voltages. The balanced transmit pulses may improve power delivery to the transducer array 108 and reduce heating that results from power losses. The full-cycle waves generated using the transducer array 108 may end on a positive half-cycle. This may reinforce the manufacturing poling of the ultrasound system 100 extending its lifetime.

Figure 1B:
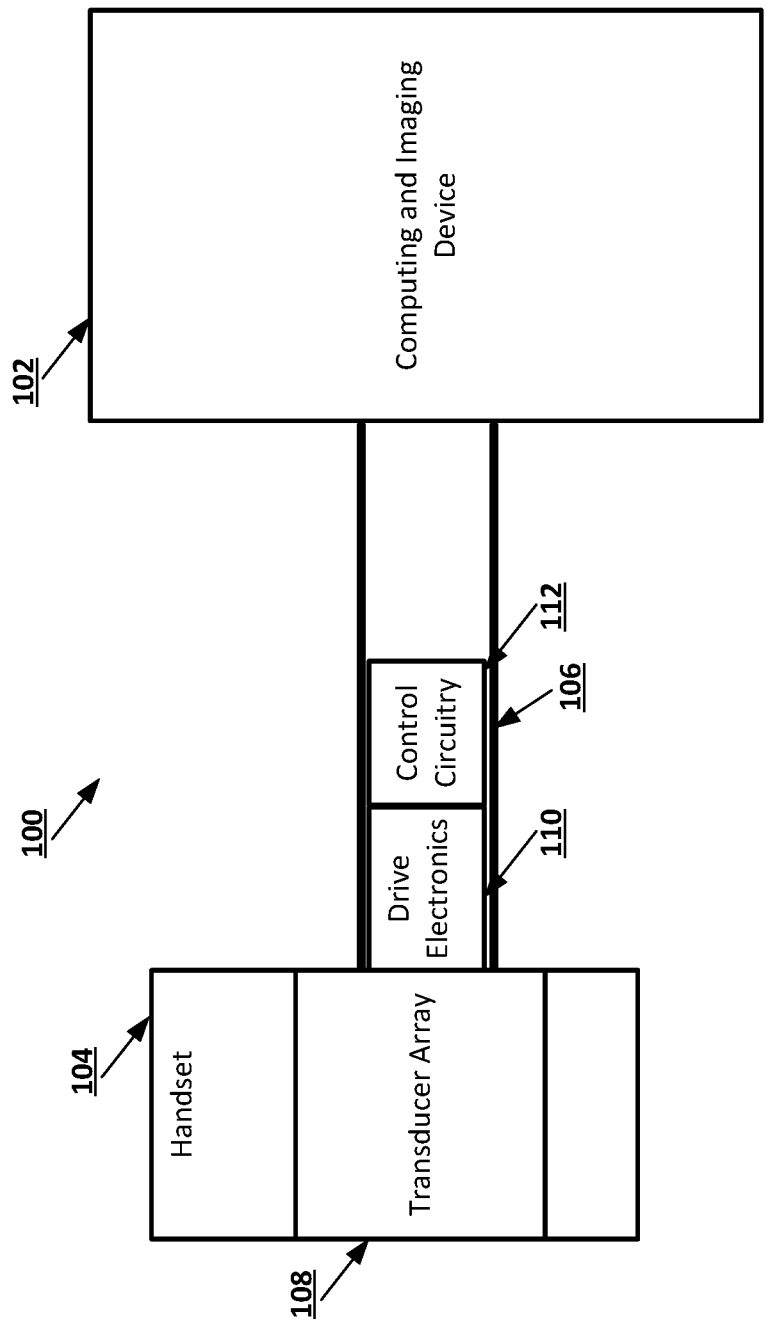
FIG. 1B shows an example system for generating histotripsy therapy pulses using full cycle transmit according to an implementation of the disclosed subject matter.

FIG. 1B shows an example system for generating histotripsy therapy pulses using full cycle transmit according to an implementation of the disclosed subject matter. The control circuitry 112 for the ASICs in the drive electronics 110 may, instead of being integrated into the drive electronics 110, be digital ASICs or FPGAs closely located to, for example, less than 20 cm from, the transducer elements of the transducer array 108 and from the drive electronics 110.

Figure 2:
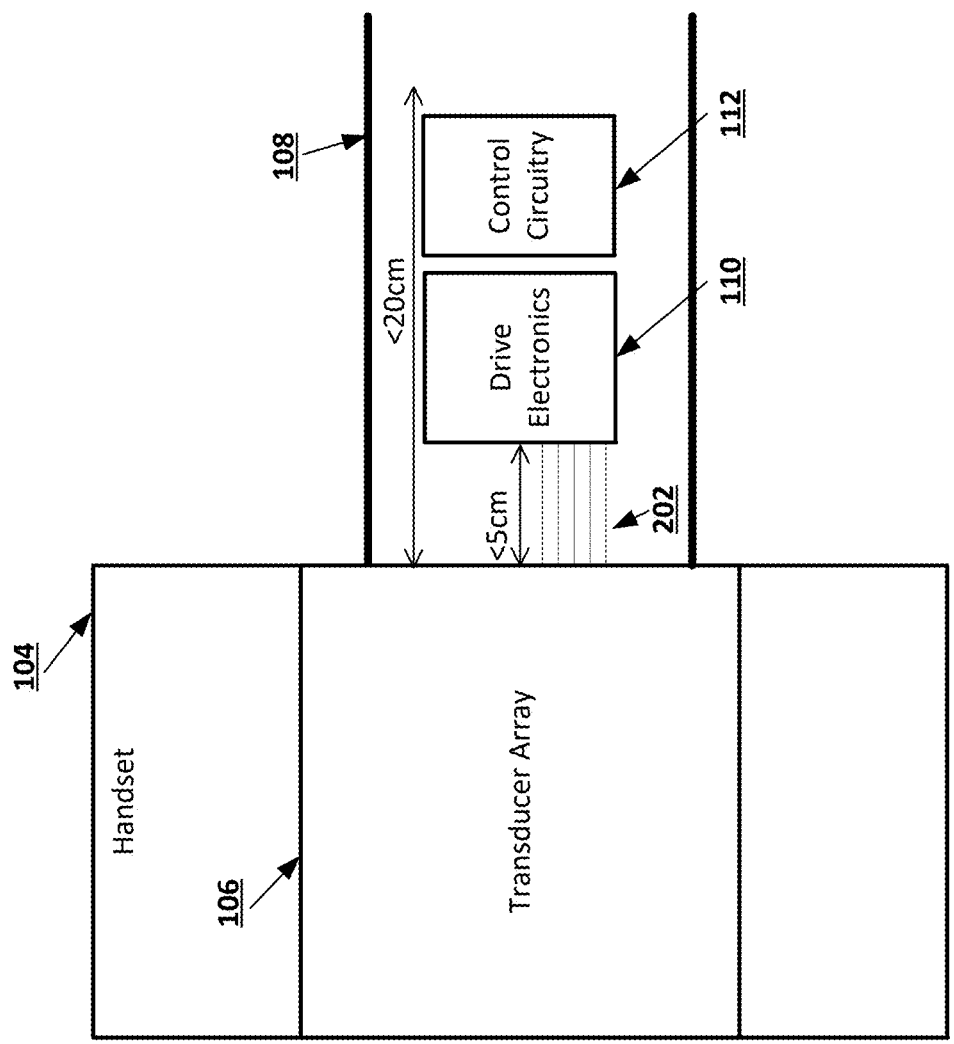
FIG. 2 shows an example system for generating histotripsy therapy pulses using full cycle transmit according to an implementation of the disclosed subject matter.

FIG. 2 shows an example system for generating histotripsy therapy pulses using full cycle transmit according to an implementation of the disclosed subject matter. Traces 202 may electrically connect the drive electronics 110 to the transducer elements of the transducer array 108. The traces 202 may be less than 5 cm in length, from the drive electronics 110 to the transducer elements of the transducer array 108. This may minimize electrical losses due to electrical and acoustic mismatch. The control circuitry 112 for the drive electronics 110 may be positioned at the end of the cable 106 so that the drive electronics 110 are located less than 20 cm from the transducer array 108 if the control circuitry 112 is not integrated into the drive electronics 110.

Figure 3A:
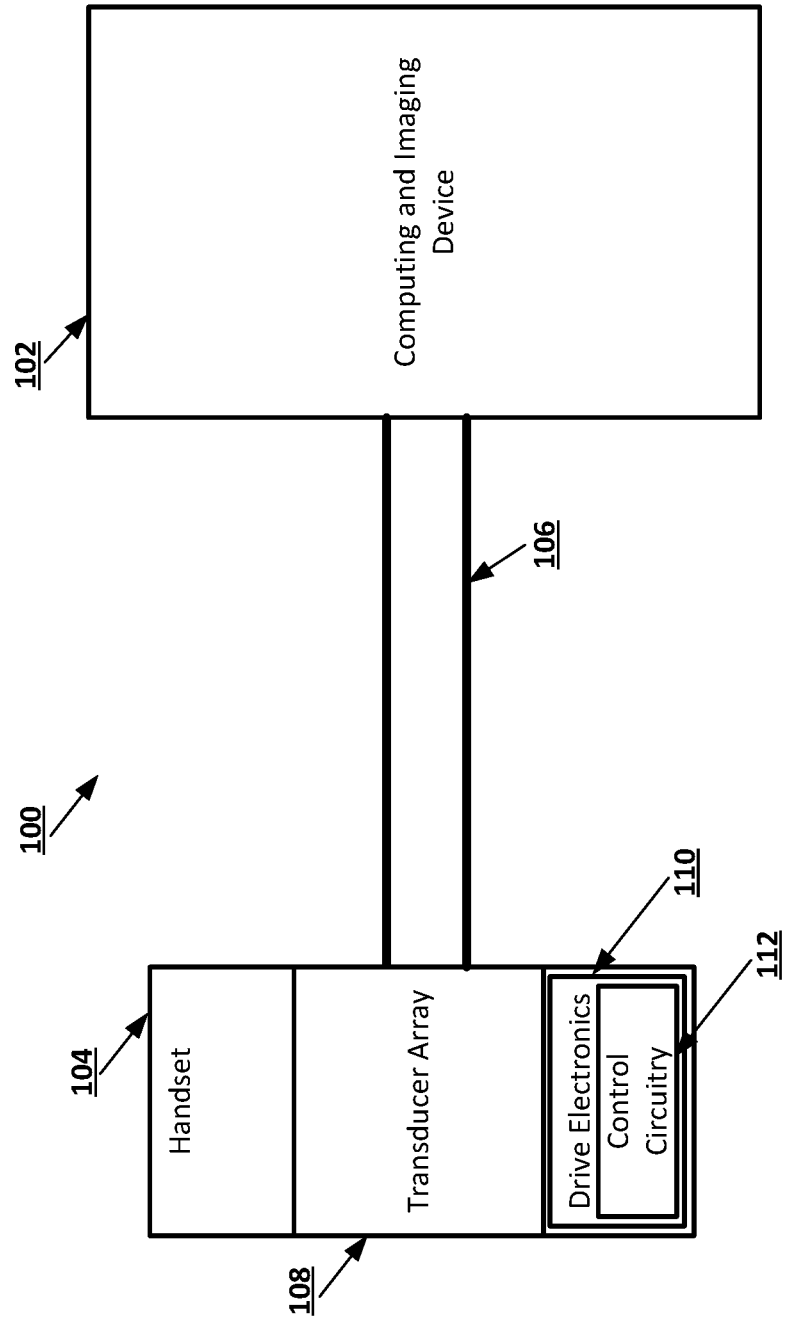
FIG. 3A shows an example system for generating histotripsy therapy pulses using full cycle transmit according to an implementation of the disclosed subject matter.

FIG. 3A shows an example system for generating histotripsy therapy pulses using full cycle transmit according to an implementation of the disclosed subject matter. The handset 104 may include the drive electronics 110. The drive electronics 110 may include electronics and accompanying circuitry that may drive the transducer elements of the transducer array 108 using power from the cable 106. The drive electronics 110 may be located within the handset 104 and may be positioned as close to the transducer array 108 as possible. The drive electronics 110 may include, for example, ASICs with the transmit circuitry built on a high-voltage CMOS process with a gate-drive tolerance of 100V+. The control circuitry 112 for the ASICs in the drive electronics 110 may be, for example, integrated within the ASICs the control circuitry controls, or may be digital ASICs or FPGAs closely located to, for example, less than 20 cm from, the transducer elements of the transducer array 108. The clock rate at which the transmit circuitry of the ASICs of the drive electronics 110 is triggered may be frequency matched to within the −3 dB passband of the acoustic resonating materials of the transducers. The total length of circuit board traces from the ASICs of the drive electronics 110 to the transducer elements of the transducer array 108 may be minimized, for example, less than 5 cm, which may minimize electrical losses due to electrical and acoustic mismatch. This may allow the transducer array 108 to generate pulses with histotripsy-level pressure waves using approximately 100V of drive voltage, lower than the 600-900V of drive voltage that may be needed when using half-cycle, negative transmit pulses.

Figure 3B:
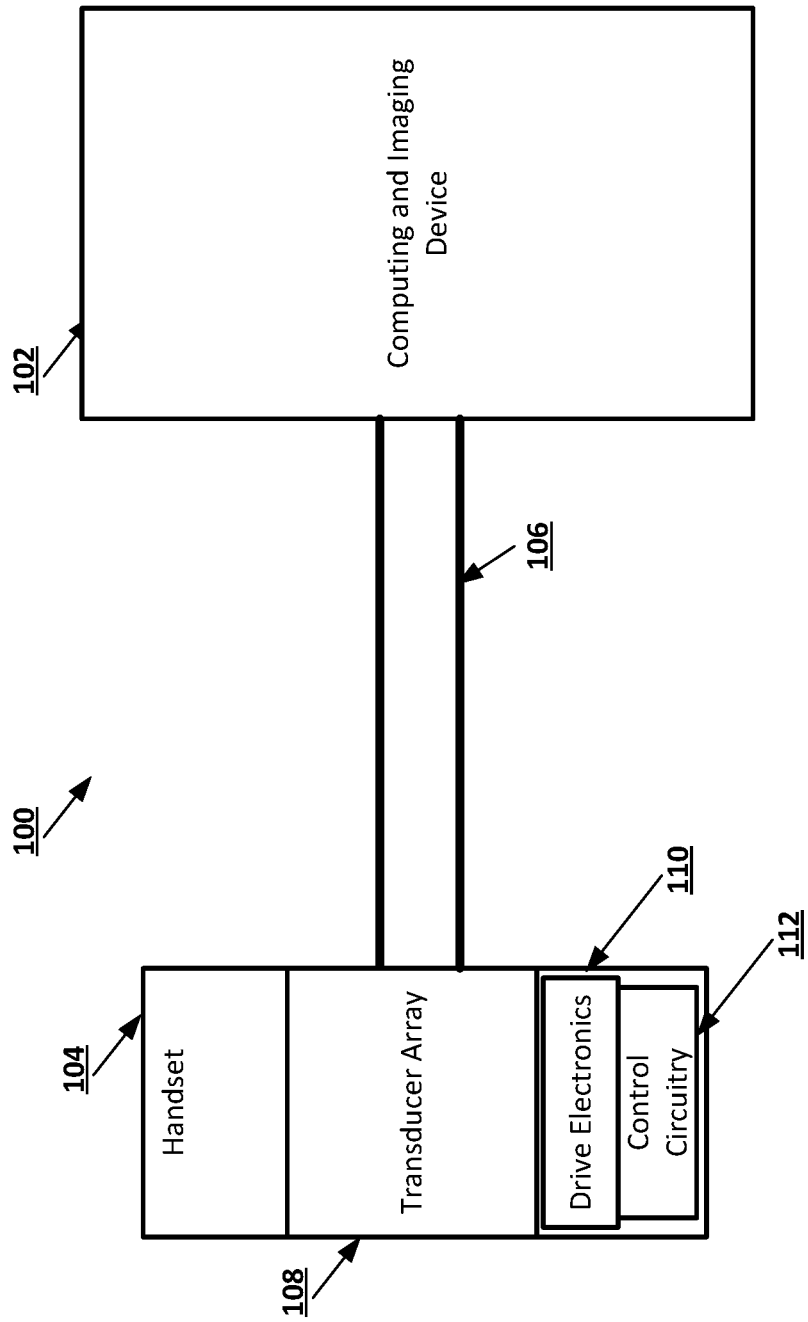
FIG. 3B shows an example system for generating histotripsy therapy pulses using full cycle transmit according to an implementation of the disclosed subject matter.

FIG. 3B shows an example system for generating histotripsy therapy pulses using full cycle transmit according to an implementation of the disclosed subject matter. The control circuitry 112 for the ASICs in the drive electronics 110 may be, for example, digital ASICs or FPGAs closely located to, for example, less than 20 cm from, the transducer elements of the transducer array 108.

Figure 3C:
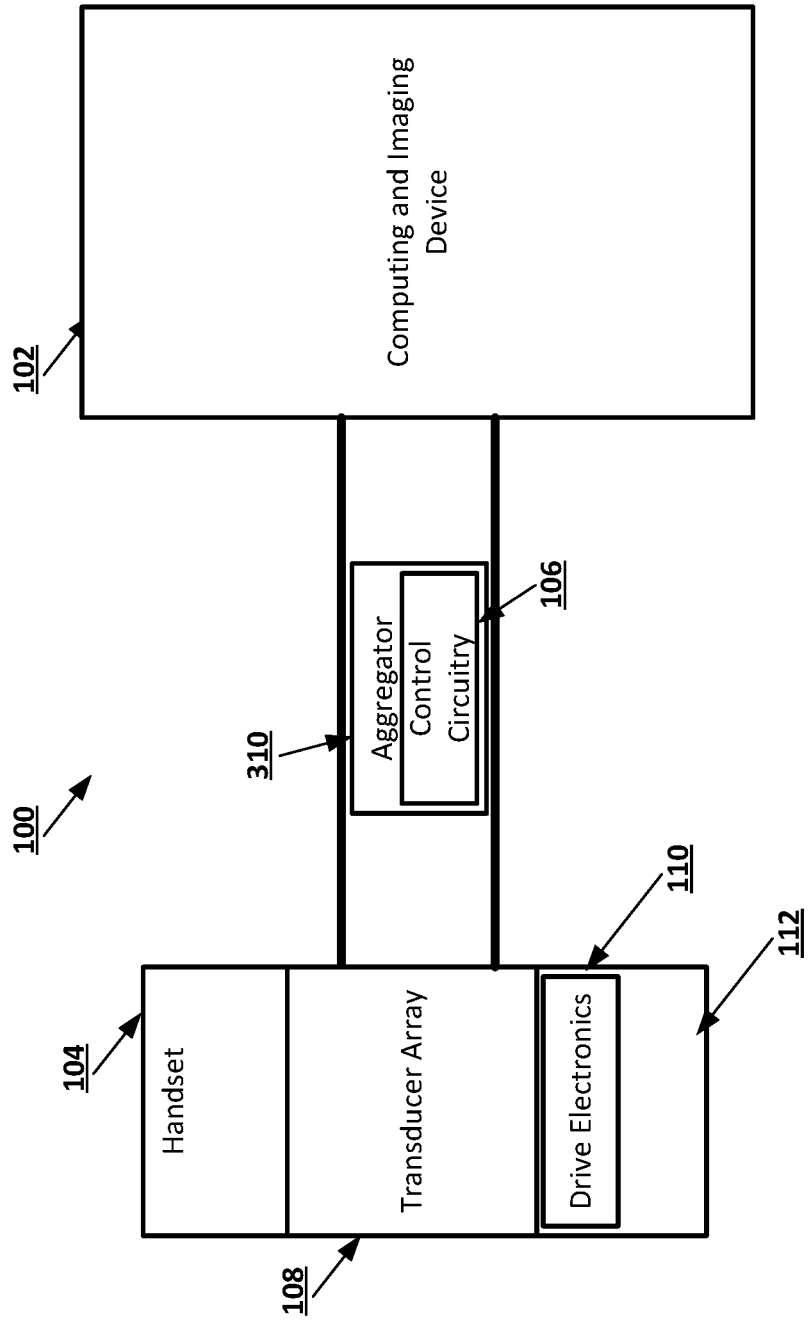
FIG. 3C shows an example system for generating histotripsy therapy pulses using full cycle transmit according to an implementation of the disclosed subject matter.

FIG. 3C shows an example system for generating histotripsy therapy pulses using full cycle transmit according to an implementation of the disclosed subject matter. The control circuitry 112 for the ASICs in the drive electronics 110 may be, for example, digital ASICs or FPGAs located part-way along the cable 106 as part of a separate control platform or aggregator 310.

Figure 4:
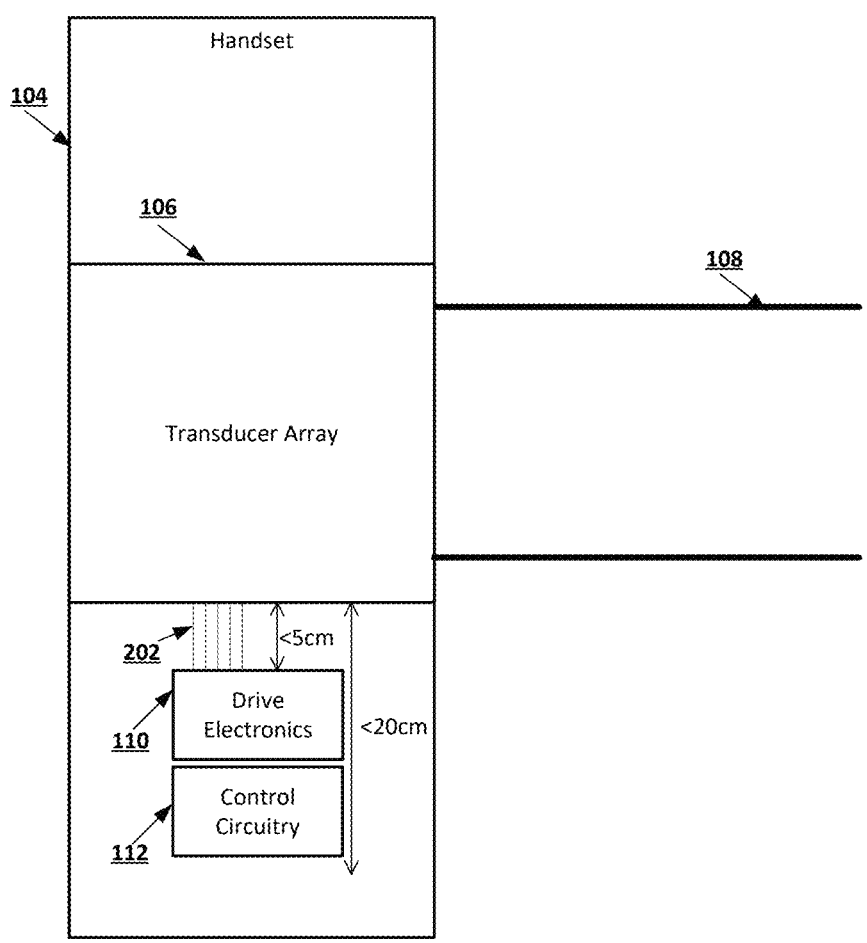
FIG. 4 shows an example system for generating histotripsy therapy pulses using full cycle transmit according to an implementation of the disclosed subject matter.

FIG. 4 shows an example system for generating histotripsy therapy pulses using full cycle transmit according to an implementation of the disclosed subject matter. The traces 202 may electrically connect the drive electronics 110 to the transducer elements of the transducer array 108. The traces 202 may be less than 5 cm in length, from the drive electronics 110 to the transducer elements of the transducer array 108. This may minimize electrical losses due to electrical and acoustic mismatch. The control circuitry 112 for the drive the drive electronics 110 may be positioned within the handset 104 so that the drive electronics 110 are located less than 20 cm from the transducer array 108 if the control circuitry 112 is not integrated into the drive electronics 110.

In some implementations, a secondary control board, or aggregator, may sit in between the handset 104 and the computing and imaging device 102. The secondary control board may include minimal pass-through to everything except the user interface of the ultrasound system and the final drive stage for the generation of signals from the transducer array 108. In some implementations, the aggregator may include some or all of the drive electronics. The aggregator may include any portion of the electronic systems.

Figure 5:
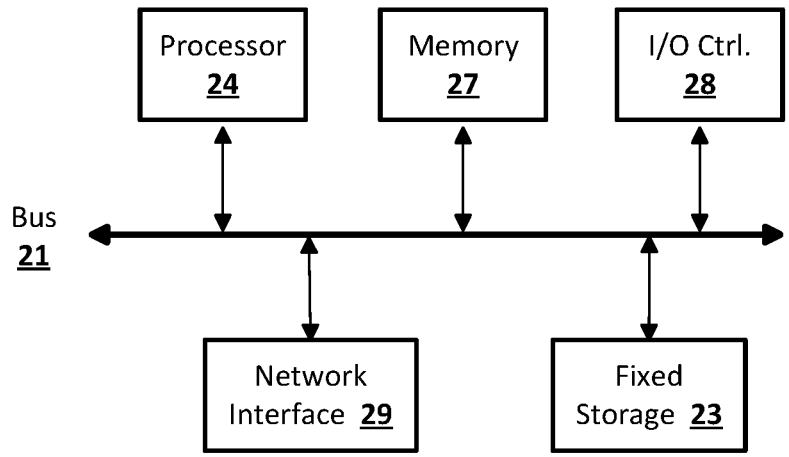
FIG. 5 shows a computer according to an implementation of the disclosed subject matter.

Implementations of the presently disclosed subject matter may be implemented in and used with a variety of component and network architectures. FIG. 5 is an example computer 20 suitable for implementations of the presently disclosed subject matter. The computer 20 includes a bus 21 which interconnects major components of the computer 20, such as a central processor 24, a memory 27 (typically RAM, but which may also include ROM, flash RAM, or the like), an input/output controller 28, a user display 22, such as a display screen via a display adapter, a user input interface 26, which may include one or more controllers and associated user input devices such as a keyboard, mouse, and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 allows data communication between the central processor 24 and the memory 27, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection, or the like. For example, the network interface 29 may allow the computer to communicate with other computers via one or more local, wide-area, or other networks, as shown in FIG. 6.

Many other devices or components (not shown) may be connected in a similar manner (e.g., document scanners, digital cameras, and so on). Conversely, all of the components shown in FIG. 5 need not be present to practice the present disclosure. The components can be interconnected in different ways from that shown. The operation of a computer such as that shown in FIG. 5 is readily known in the art and is not discussed in detail in this application. Code to implement the present disclosure can be stored in computer-readable storage media such as one or more of the memory 27, fixed storage 23, removable media 25, or on a remote storage location.

Figure 6:
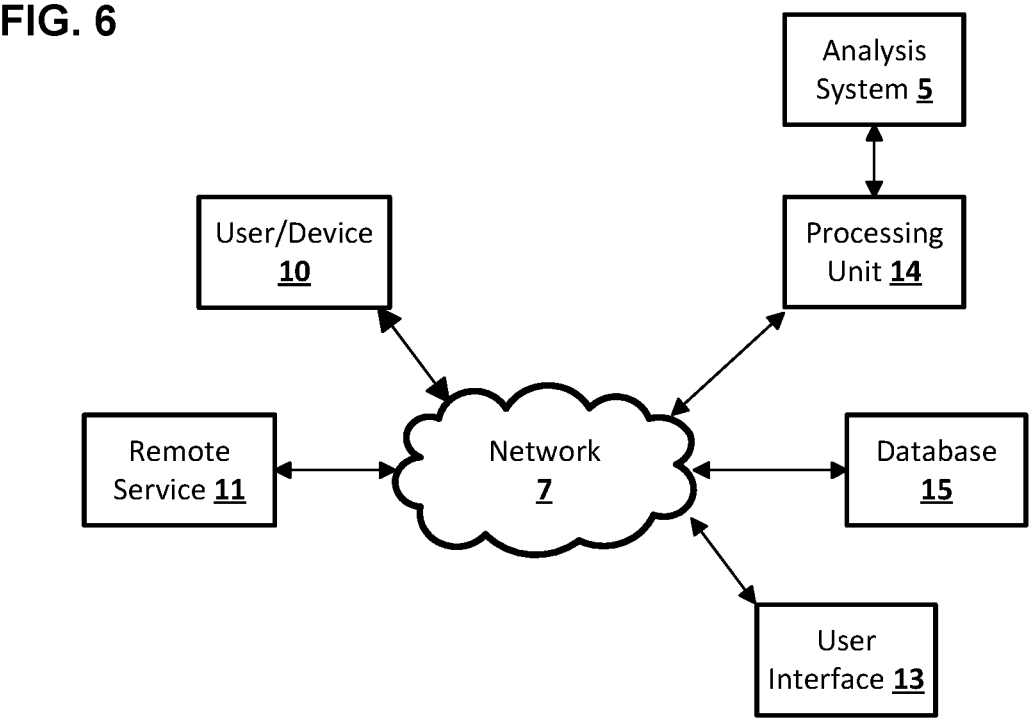
FIG. 6 shows a network configuration according to an implementation of the disclosed subject matter.

FIG. 6 shows an example network arrangement according to an implementation of the disclosed subject matter. One or more clients 10, 11, such as local computers, smart phones, tablet computing devices, and the like may connect to other devices via one or more networks 7. The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15.

More generally, various implementations of the presently disclosed subject matter may include or be implemented in the form of computer-implemented processes and apparatuses for practicing those processes. The disclosed subject matter also may be implemented in the form of a computer program product having computer program code containing instructions implemented in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions.

Implementations may use hardware that includes a processor, such as a general-purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A system for generating pressure waves for intrinsic or boiling histotripsy comprising:
   a transducer array comprising transducer elements;
   a computing and imaging device; and
   drive electronics disposed such that traces from the drive electronics to the transducer elements of the transducer array are no more than 5 cm in length.

2. The system of claim 1, wherein the drive electronics are disposed within a cable that connects the computing and imaging device to a handset that comprises the transducer array.

3. The system of claim 1, wherein the drive electronics are disposed within a handset that comprises the transducer array.

4. The system of claim 1, further comprising control circuitry for the drive electronics.

5. The system of claim 4, wherein the control circuitry is integrated into the drive electronics.

6. The system of claim 4, wherein the control circuitry is disposed no more than 20 cm from the transducer array.

7. The system of claim 4, wherein the control circuitry comprises digital ASICs or FPGAs.

8. The system of claim 1, wherein the drive electronics comprise ASICs comprising transmit circuitry built on a high-voltage CMOS process with a gate-drive tolerance of 100V+.

9. The system of claim 1, wherein the clock rate at which transmit circuitry of the drive electronics is triggered is frequency matched to within the −3 dB passband of the acoustic resonating materials of the transducer elements of the transducer array.

10. The system of claim 1, wherein the drive electronics are used for frequency tuning.

11. The system of claim 1, wherein the drive electronics comprise amplitude control that uses envelope shaping of the drive pulse either in discrete steps or as a continuous amplitude change.

12. The system of claim 11, wherein the drive pulse finishes on either the positive or negative half of the drive pulse by starting with a selection of a positive direction or negative direction or by adding a half cycle to the end of the drive pulse.

13. The system of claim 1, wherein the transducer array generates balanced transmit pulses.

14. The system of claim 1, wherein the transducer array generates unbalanced transmit pulses to stress negative pressure pulses.

15. The system of claim 1, wherein the transducer array generates full-cycle waves.

16. A device comprising:
   a handset comprising a transducer array comprising transducer elements;
   a cable connected to the handset;
   drive electronics disposed within the cable, the drive electronics configured to drive the transducer elements and disposed such that traces connecting the drive electronics to the transducer array are no more than 5 cm in length; and
   control circuitry for the drive electronics.

17. The device of claim 16, wherein the control circuitry for the drive electronics is integrated into the drive electronics.

18. The device of claim 16, wherein the control circuitry for the drive electronics is disposed no more than 20 cm from the transducer array.

19. The device of claim 16, wherein the drive electronics comprise ASICs comprising transmit circuitry built on a high-voltage CMOS process with a gate-drive tolerance of 100V+.

* * * * *